No. 609,293. Patented Aug. 16, 1898.
S. M. PERRIN.
BALING PRESS.
(Application filed Jan. 21, 1898.)
(No Model.) 2 Sheets—Sheet I.
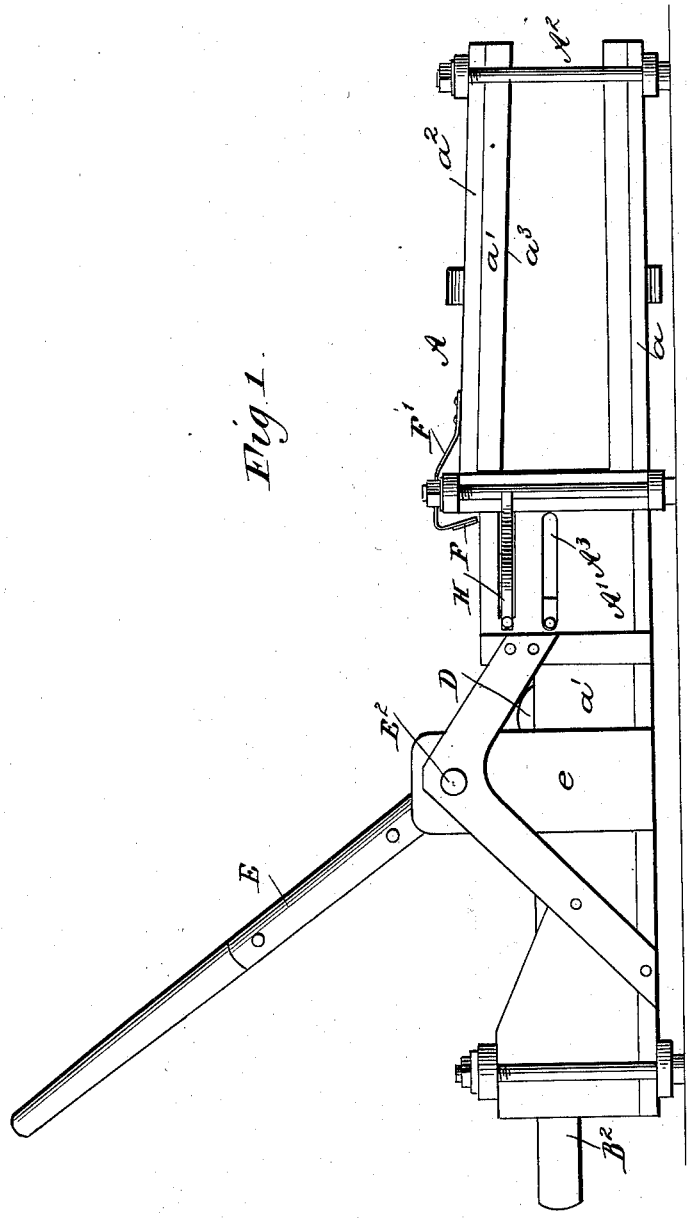
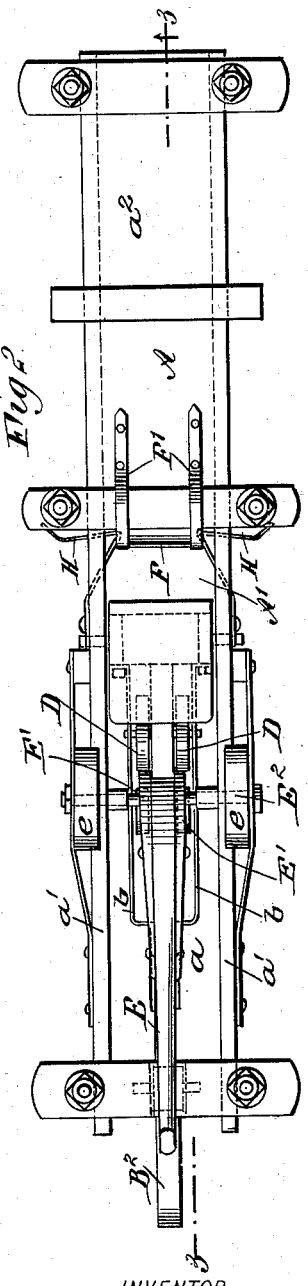
WITNESSES:
INVENTOR
S. M. Perrin.
BY
ATTORNEYS.

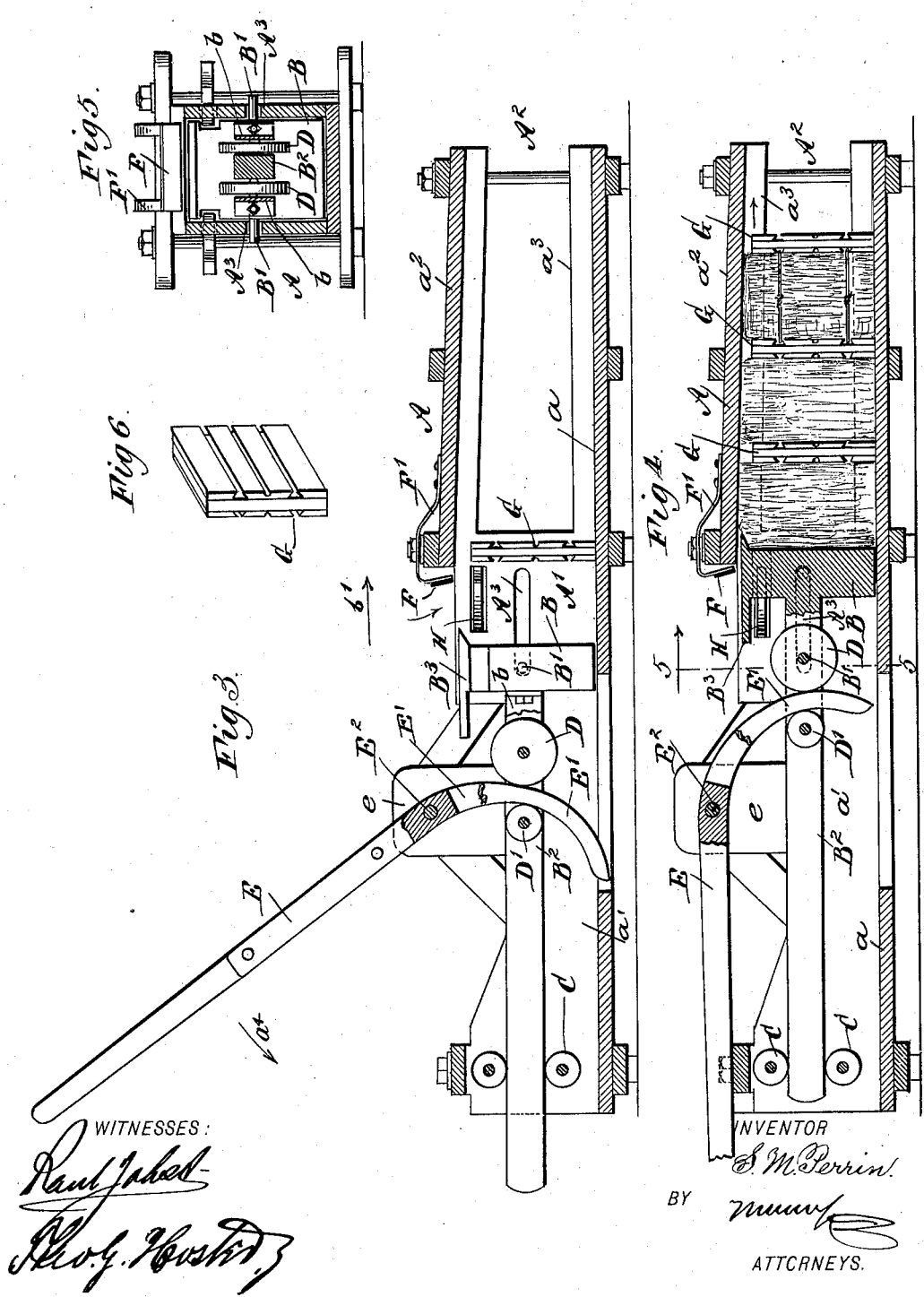

UNITED STATES PATENT OFFICE.

SUMMERFIELD MARCHEL PERRIN, OF COLUMBIA, SOUTH CAROLINA, ASSIGNOR OF THREE-FOURTHS TO WILLIAM J. KEENAN, OF SAME PLACE.

BALING-PRESS.

SPECIFICATION forming part of Letters Patent No. 609,293, dated August 16, 1898.

Application filed January 21, 1898. Serial No. 667,444. (No model.)

*To all whom it may concern:*

Be it known that I, SUMMERFIELD MARCHEL PERRIN, of Columbia, in the county of Richland and State of South Carolina, have invented a new and Improved Baling-Press, of which the following is a full, clear, and exact description.

The object of the invention is to provide a new and improved baling-press which is simple and durable in construction, continuous in operation, and arranged to discharge a completed bale automatically.

The invention consists of novel features and parts and combinations of the same, as will be described hereinafter and pointed out in the claims.

Reference is to be had to the accompanying drawings, forming a part of this specification, in which similar characters of reference indicate corresponding parts in all the figures.

Figure 1 is a side elevation of the improvement. Fig. 2 is a plan view of the same. Fig. 3 is a longitudinal sectional side elevation of the same on the line 3 3 of Fig. 2. Fig. 4 is a similar view of the same with parts in a different position. Fig. 5 is a transverse section of the same on the line 5 5 of Fig. 4, and Fig. 6 is a perspective view of one of the follower-blocks.

The framing of the machine has a continuous bottom portion $a$, on which stand the sides $a'$. A packing-box A is formed by a top or cover $a^2$, mounted on the sides $a'$ and covering approximately one-half of the frame, the framing portion thereof being uncovered at the top to provide the receiving and packing chamber A'. The packing-box A diminishes in size from the receiving and packing chamber A' to the discharge end $A^2$, so that bales formed in the box and moved successively toward the small end $A^2$ have sufficient frictional resistance to the plunger B to properly compress the material and at the same time move the finished bale gradually toward the discharge end to finally discharge the same automatically therefrom. The open top of the receiving-chamber A' is for placing the material into the chamber at the time the plunger B is in an outermost position, as indicated in Fig. 3. The packing-box A is formed with its sides open at $a^3$ to permit of conveniently introducing the wire or other material for binding the bale after the material is compressed.

The plunger B is mounted to move back and forth in the box A and chamber A' and is provided on its sides with pins B', mounted to slide in longitudinal guideways $A^3$, formed in the sides $a'$ of the frame at the chamber A'. The plunger B is provided with a rearwardly-extending plunger-rod $B^2$, guided near its rear end between suitable antifriction-rollers C, journaled between the sides $a'$ of the frame of the machine and at the rear extremity thereof. On each side of the plunger-rod $B^2$, near the plunger B, are journaled two antifriction-rollers D D', spaced apart and held, respectively, by straps $b$, fastened one on each side of the plunger-rod $B^2$. The plunger-rod $B^2$ is operated by a cam-lever E, fulcrumed on a pin $E^2$, held between stanchions $e$, rising, respectively, from the frame sides $a'$. The lever E has fast to each side thereof and running parallel with each other cam-arms E', which straddle the rod $B^2$ and respectively pass inside of the straps $b$ and between the members of the respective pairs of rollers C.

When the lever E is in the position shown in Fig. 3 and the operator bears down on said lever to impart a swinging motion thereto in the direction of the arrow $a^4$, then the cam-arms E' of the lever E engage the antifriction-rollers D and move the plunger-rod and the plunger forward in the direction of the arrow $b'$ to compress the material in the box A, and when the lever E is swung in the inverse direction of the arrow $a^4$ then the cam-arms E' act on the other antifriction-rollers D' to move the plunger B in the inverse direction of the arrow $b'$. The antifriction-rollers D are preferably made larger in diameter than the antifriction-rollers D' to give more purchasing power to the lever E when pushing the plunger B forward in the chamber A'.

The plunger B is formed with a rearwardly-extending top $B^3$, slightly beveled at its forward end to project beyond the front face of the plunger, as plainly indicated in Fig. 3. By this arrangement the material can be readily passed over the top B³ into the receiving-chamber A' at the time the plunger B is in a rearmost position, as indicated in Fig. 3, the material being placed in proper position within the box A by making contact with a guide F, extending transversely in the forward end of the opening in the top of the chamber A'. The guide F is preferably mounted on springs F', attached to the top of the box A. When the plunger is in the rearmost position and the chamber A' is open, then a follower-block G is inserted in the front end of the box for the material to abut against and to form a boundary for a bale of the desired size.

In order to lock the plunger B temporarily in a forward position, as shown in Fig. 4, I provide spring-catches H, held in the sides of the chamber A' and adapted to snap in against the rear face of the plunger when the latter moves into a forward position and the lever E is down in a lowermost position, as indicated in said Fig. 4.

Now it is evident that when the machine is in operation the bales already formed and extending in the box A form a resistance for the material to be compressed by the plunger B in the chamber A', as the material composing the bales is further compressed by the diminishing box A as the bales move forward toward the discharge end A². The transverse area of the box throughout its length is gradually diminished to such an extent that the plunger B in moving forward to compress the material receives sufficient resistance from the bales in the box that the material is properly compressed, and at the same time the compressed material, together with the bales already formed, is pushed forward in the box A. As soon as the material is compressed and moved into the rear end of the box A then the plunger B is returned to its previous position, (shown in Fig. 3,) a new follower-block G is inserted in the forward end of the chamber A' against the compressed material, and the chamber A' is again filled with loose material to be compressed. The material already compressed into a bale and extending between two follower-blocks G is wired in the usual manner to complete the bale previous to the bale reaching the discharge end A².

It should be understood that the follower-blocks are of such a size as to slide loosely in the box A, each follower-block being somewhat less in size than the outlet-opening of the box, and hence it is only the material composing the bales that forms the resistance for pressing the loose material by the plunger.

It will be seen that by the construction described the press is rendered continuous, can be easily manipulated, and by the use of the press a large number of bales can be formed in a comparatively short time.

Having thus fully described my invention, I claim as new and desire to secure by Letters Patent—

1. A baling-press having an elongate frame formed of a bottom portion with sides standing thereon, and with a top covering a portion of the frame to form a packing-box, such packing-box diminishing in size toward its discharge end and the remainder of the frame being open at its top to form a receiving and packing chamber, a plunger movable back and forth through the packing-box and receiving-chamber, a plunger-rod attached to the plunger and located in the receiving-chamber, antifriction-rollers held between the sides of the frame and guiding the rear portion of the plunger-rod, straps attached respectively to the sides of the plunger-rod, two antifriction-rollers held at each side of the plunger-rod by means of said straps, stanchions rising from the sides of the frame at the receiving-chamber, a lever fulcrumed between said stanchions, and two cam-arms fast to the lever and straddling the plunger-rod and passed respectively between the members of the pairs of antifriction-rollers on said rod and inside of the straps of the plunger-rod.

2. In a baling-press, the combination with a frame comprising a packing-box, of a plunger slidable in and out of said box, a plunger-rod attached to the plunger and guided by the frame, two straps respectively attached to the sides of the plunger-rod, two antifriction-rollers at each side of the plunger-rod, such pairs of antifriction-rollers being respectively held by the straps, a lever fulcrumed on the frame, and two cam-arms attached to the lever and straddling the plunger-rod, the cam-arms respectively passing between the members of the pairs of antifriction-rollers and inside of the respective straps.

SUMMERFIELD MARCHEL PERRIN.

Witnesses:
W. E. YOUNG,
D. KEENAN.